J. V. NORLEN.
SAW SET.
APPLICATION FILED NOV. 24, 1917.
1,302,581.
Patented May 6, 1919.
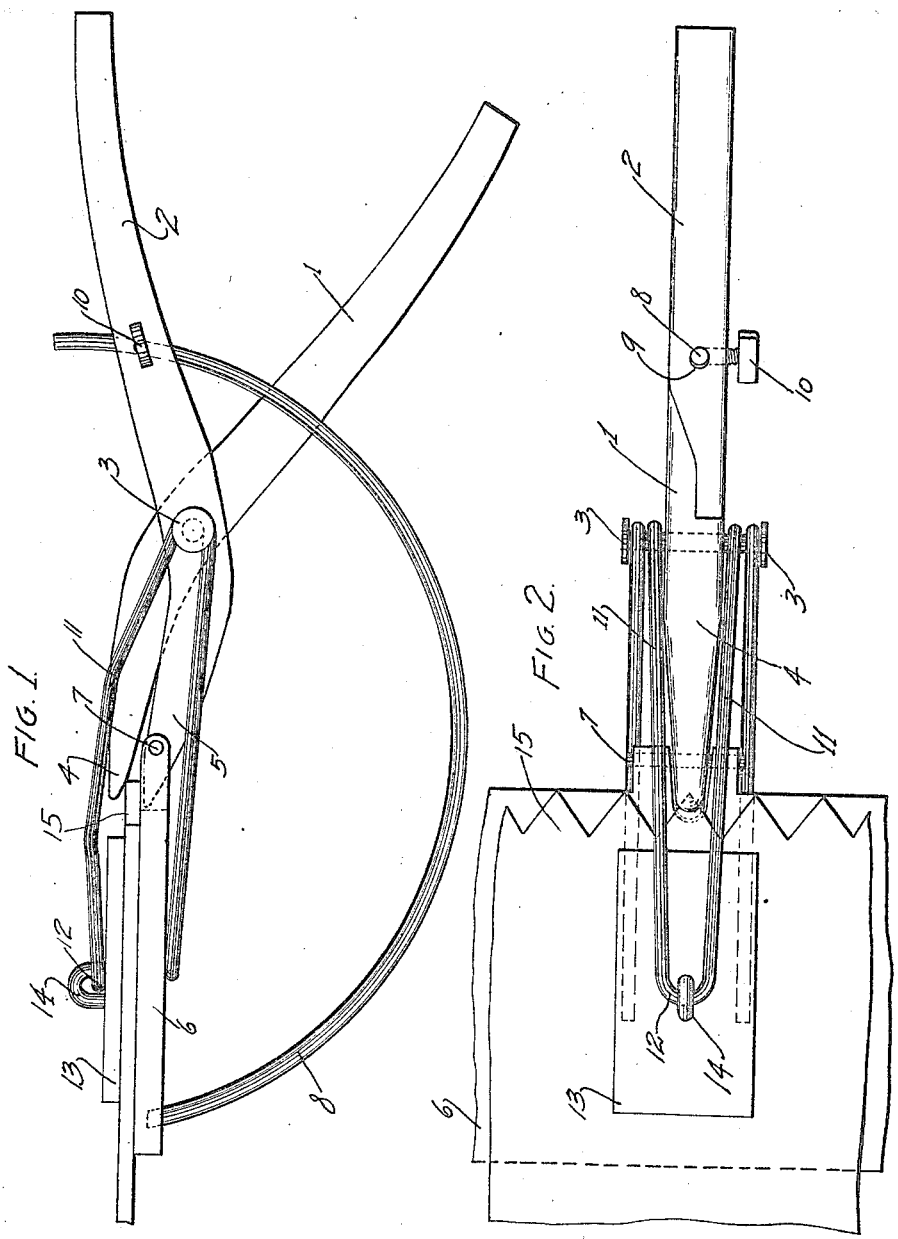

UNITED STATES PATENT OFFICE.

JONAS VICTOR NORLEN, OF YOUNGSTOWN, ALBERTA, CANADA.

SAW-SET.

1,302,581.

Specification of Letters Patent.

Patented May 6, 1919.

Application filed November 24, 1917. Serial No. 203,843.

*To all whom it may concern:*

Be it known that I, JONAS V. NORLEN, a citizen of Canada, residing at Youngstown, in the Province of Alberta and Dominion of Canada, have invented certain new and useful Improvements in Saw-Sets, of which the following is a specification.

This invention relates to improvements in saw sets and its object is to produce a device of this class that is simple in construction, positive and efficient in operation and cheap to manufacture. With the foregoing and other objects in view the invention consists in the combination and arrangement of parts to be hereinafter fully described, pointed out in the appended claims and illustrated in the accompanying drawing which forms a part of this specification and in which—

Figure 1 is a view of my improved saw set in side elevation in use.

Fig. 2 is a top plan view of Fig. 1.

Like reference characters denote corresponding parts in both views.

My invention comprises a pair of angular arms 1, 2 connected, scissors-like, by a pin 3, said arms forming jaws 4, 5 at one extremity and handles at the other extremity, the arm 1 being loose upon the pin 3. To the jaw 5 I secure a plate 6 by a pivot pin 7, said plate being bifurcated to receive the jaw extremity. A curved bar 8 has one end embedded in the said plate 6 and its other end passes through an aperture 9 in the handle-end of the arm 2 and a set screw 10 carried by said arm 2 extends into the aperture 9 for engagement with the bar 8 to lock it in adjusted position. By means of the arm 8 and set screw 10 the plate 6 may be locked in adjusted position with relation to the jaw 5.

A stout spring 11 is wound about the pivot pin 3 at opposite sides of the handles 1, 2, the free ends of said spring binding against the plate 6. A loop 12 is formed in said spring and projects beyond the jaws 4, 5 and carries a plate 13 by the bail 14, said loop being spaced away from the spring ends by the plates 13, 6, the tendency of the spring coils about the pin 3 being to bring the loop 12 and spring ends together. The saw to be operated upon is placed between the plates 13 and 6 while they are manually forced apart. The plate 6 supports the saw blade, although an operator at each end of the blade may hold the saw during the operation, and the plate 13 clamps the blade in position upon said plate 6. The teeth 15 of the saw, as they are individually operated upon, project between the prongs of the plate 6 between the jaws 4, 5. The jaw 4 is relatively movable and is used to bend the saw teeth toward the jaw 5. The bar 8 permits the operator to tilt the saw blade to any angle with the jaw 5 desired.

What is claimed is:—

1. In a saw set, a pair of arms connected together to form jaws and handles, one of said jaws being relatively movable, a plate pivoted to one of said jaws, a rod terminally embedded in said plate and adjustably connected to the said jaw, a compression spring carried by the pivot of said jaws and bearing against the said plate, and a second plate carried by said compression spring for yielding engagement with the first named plate.

2. In a saw set, a pair of arms connected together to form jaws and handles, one of said jaws being relatively movable, a bifurcated plate terminally pivoted to one of said jaws, a curved rod terminally embedded in said plate and adjustably connected to the said jaw, a compression spring carried by the pivot of said jaws and bearing against the said plate, and a second plate carried by said compression spring for yielding engagement with the first named plate.

3. In a saw set, a pair of arms connected together to form jaws and handles, one of said jaws being relatively movable, a bifurcated plate terminally pivoted to one of said jaws, a second plate adapted for coöperation with said bifurcated plate, means connecting said plates and the pivot of said jaws whereby said plates are yieldingly retained in engaged relation, and means connecting said bifurcated plate and one of said handles whereby said plate may be adjusted with relation to said jaws.

4. In a saw set, a pair of arms connected together to form jaws and handles, one of said jaws being relatively movable, one of said handles being apertured, a bifurcated plate terminally pivoted to one of said jaws, a rod terminally embedded in said plate for engagement with the apertured portion of said handle, means for releasably securing said rod in adjusted position with relation to said handle, a compression spring carried by the pivot of said jaws and bearing against the said plate, and a second plate carried by said compression spring for yielding engagement with the first named plate.

In testimony that I claim the foregoing as my own I have hereto affixed my signature in the presence of two subscribing witnesses.

JONAS VICTOR NORLEN.

Witnesses:
W. C. ROBINSON,
M. ETHEL ROBINSON.

Copies of this patent may be obtained for five cents each, by addressing the "Commissioner of Patents, Washington, D. C."